(12) United States Patent
Uhara et al.

(10) Patent No.: US 7,073,824 B2
(45) Date of Patent: Jul. 11, 2006

(54) FUEL TANK ARRANGEMENT IN VEHICLE

(75) Inventors: Shoji Uhara, Wako (JP); Yasuhiro Hasegawa, Wako (JP); Ryutaro Shinohara, Wako (JP); Ryuji Fujino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 10/899,312

(22) Filed: Jul. 27, 2004

(65) Prior Publication Data

US 2005/0046170 A1    Mar. 3, 2005

(30) Foreign Application Priority Data

Aug. 4, 2003   (JP) ............................. 2003-285845

(51) Int. Cl.
*B63H 11/00* (2006.01)
(52) U.S. Cl. .................... 280/834; 220/4.14; D12/218; 296/204
(58) Field of Classification Search ................ 280/830, 280/834; 220/4.14; D12/218; 296/204; 180/69.4, 69.5, 314
See application file for complete search history.

(56) References Cited

U.S. PATENT DOCUMENTS

| 4,511,176 A | 4/1985 | Watanabe et al. ........... 296/204 |
| 5,606,954 A | 3/1997 | Yamazaki et al. .......... 123/520 |
| 6,827,371 B1* | 12/2004 | Greil ......................... 280/834 |
| 2004/0099465 A1* | 5/2004 | Matsumoto et al. ........ 180/309 |

FOREIGN PATENT DOCUMENTS

| EP | 1 068 980 | 1/2001 |
| JP | 10-119593 | 5/1998 |
| JP | 2000-85382 | 3/2000 |
| JP | 3-205754 | 7/2003 |
| JP | 2003237390 | * 8/2003 |

* cited by examiner

*Primary Examiner*—Lesley D. Morris
*Assistant Examiner*—Matthew Luby
(74) *Attorney, Agent, or Firm*—Armstrong, Kratz, Quintos, Hanson & Brooks, LLP

(57) ABSTRACT

A fuel tank disposed on a lower face of a floor panel beneath a driver's seat and a passenger's seat. A protruding portion of the fuel tank that protrudes rearward is housed within floor tunnels formed in the floor panel. A fuel supply pipe is connected to the rear end of the protruding portion. This not only enables the capacity of the fuel tank to be increased by utilizing an inner space of the floor tunnels, but also enables the resistance against fuel fed to the fuel tank to be reduced by shortening the fuel supply pipe.

2 Claims, 5 Drawing Sheets

FUEL TANK ARRANGEMENT IN VEHICLE

BACKGROUND OF THE INVENTION

1. Field of the Invention

The present invention relates to a configuration of a fuel tank in a vehicle, in which the fuel tank is disposed on a lower face of a floor panel beneath a driver's seat and a passenger's seat.

2. Description of the Related Art

Japanese Patent Application Laid-open No. 2000-85382 discloses an arrangement in which a fuel tank conventionally disposed on a lower face of a floor panel beneath a rear seat is moved to a lower face of a floor panel beneath a front seat, whereby the degree of freedom in arranging the rear seat is increased to effectively utilize a space in a rear part of the vehicle body.

However, if the fuel tank is disposed on the lower face of the floor panel beneath the front seat, not only is it difficult to ensure that the fuel tank has a sufficient capacity, but also the distance from a fuel filler inlet in a rear part of the vehicle body to the fuel tank increases. Therefore, a fuel supply pipe providing a connection between the fuel filler inlet and the fuel tank inevitably becomes long, and the fuel feed resistance against fuel passing through the fuel supply pipe increases, thus resulting in a possibility that smooth feeding of fuel might be prevented. In particular, in an arrangement in which, during refueling, a mixture of evaporated fuel and air within the fuel tank is supplied to a canister, and the evaporated fuel is adsorbed by the canister so that only the air is discharged to the atmosphere, the fuel feed resistance is increased by an amount corresponding to the flow resistance in the canister. Thus, it is desirable for the fuel feed resistance of fuel supply pipe to be as low as possible.

SUMMARY OF THE INVENTION

The present invention has been achieved under the above-mentioned circumstances, and it is an object thereof to increase the capacity of a fuel tank disposed on a lower face of a floor panel beneath a front seat, and to reduce the fuel feed resistance in a fuel supply pipe for the fuel tank.

In order to attain this object, in accordance with the present invention, there is proposed a configuration of a fuel tank in a vehicle, in which the fuel tank is disposed on a lower face of a floor panel beneath a driver's seat and a passenger's seat, wherein a floor tunnel that passes between the driver's seat and the passenger's seat is formed in the floor panel, wherein a protruding portion of the fuel tank that protrudes rearward is housed within the floor tunnel, and wherein a fuel supply pipe is connected to the rear end of the protruding portion.

In accordance with the arrangement of the present invention, the fuel tank disposed on the lower face of the floor panel beneath the driver's seat and the passenger's seat has a portion thereof protruding rearward, the protruding portion is housed within the floor tunnel that is formed in the floor panel so as to pass between the driver's seat and the passenger's seat, and the fuel supply pipe is connected to the rear end of the protruding portion. Therefore, not only is it possible to increase the capacity of the fuel tank by utilizing an internal space of the floor tunnel, but it is also possible to shorten the length of the fuel supply pipe, thus reducing the fuel feed resistance against fuel fed to the fuel tank.

The present invention will be described below with reference to an embodiment of the present invention shown in the attached drawings.

BRIEF DESCRIPTION OF DRAWINGS

FIG. 1 is an overall side view of a motor vehicle,

FIG. 2 is a view taken from arrow 2 in FIG. 1,

FIG. 3 is an enlarged sectional view taken along line 3—3 in FIG. 2,

FIG. 4 is an enlarged sectional view taken along line 4—4 in FIG. 2, and

FIG. 5 is an exploded perspective view of a section in which a fuel tank is mounted.

DETAILED DESCRIPTION OF THE PREFERRED EMBODIMENT

Figure 1:
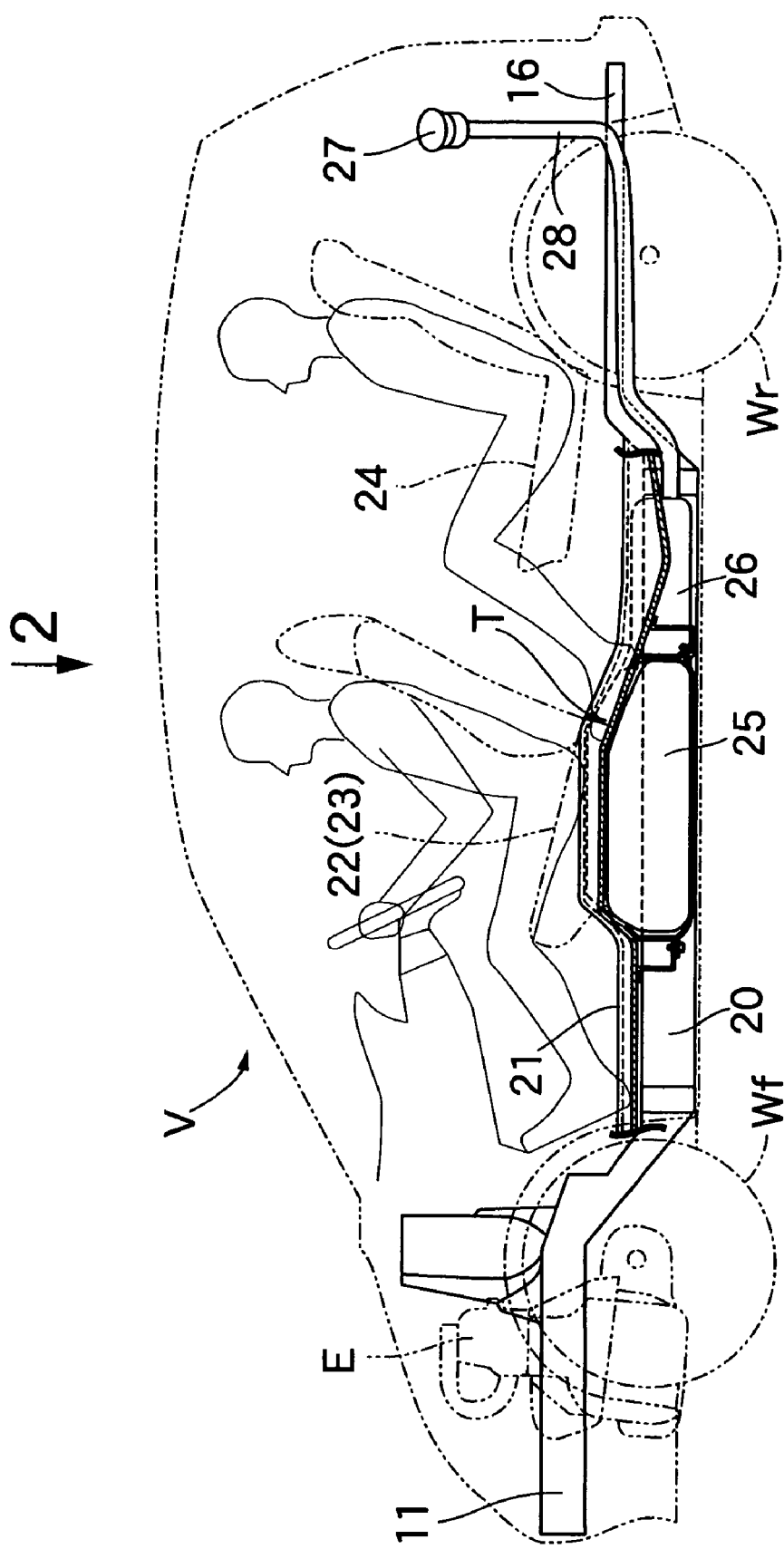
FIG. 1 to FIG. 5 illustrate one embodiment of the present invention.
Figure 2:
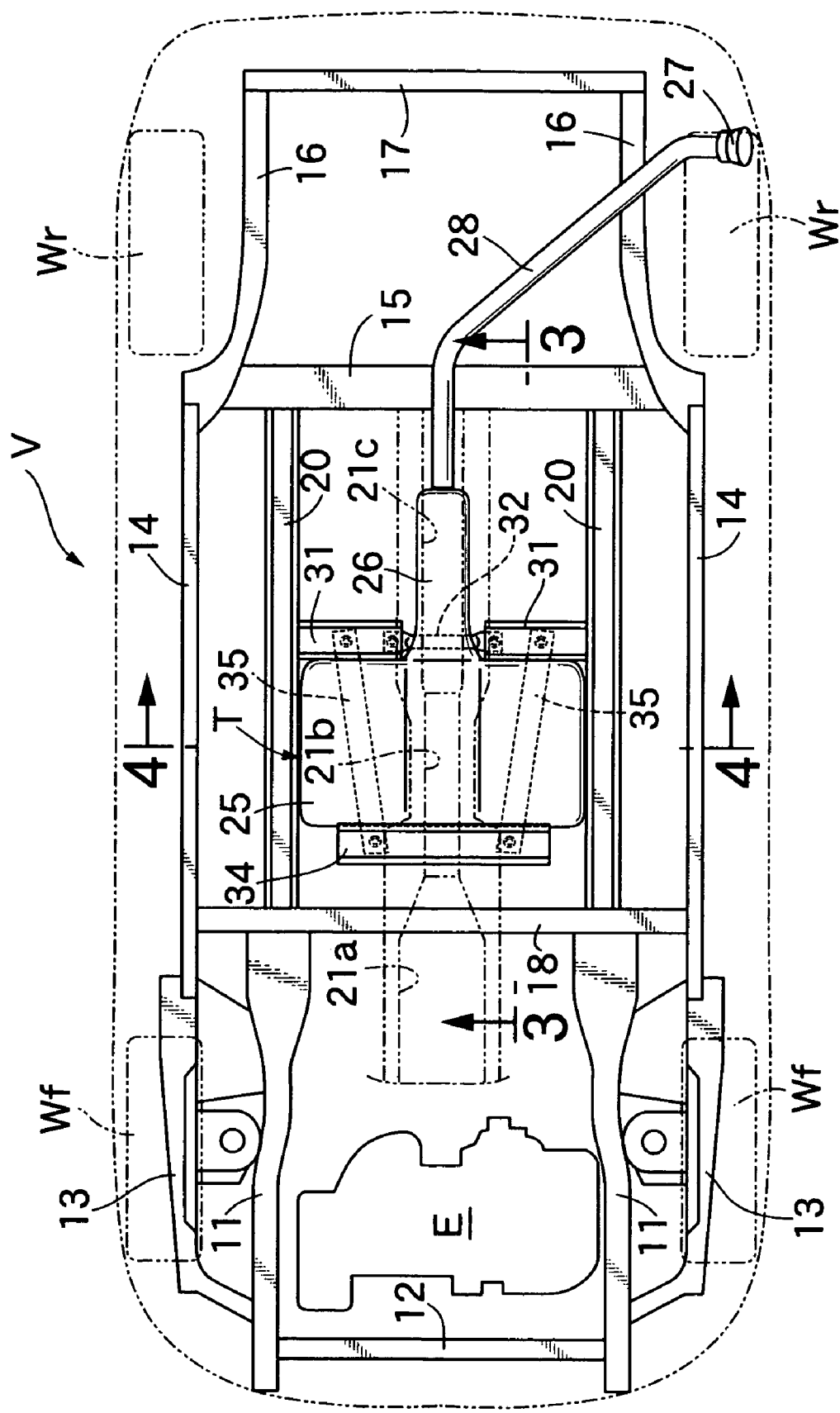

As shown in FIG. 1 and FIG. 2, a vehicle body frame of a front-engined, front-wheel-drive motor vehicle V equipped with front left and right wheels Wf and rear left and right wheels Wr includes as main components left and right front side frames 11 disposed in a vehicle body front part in which an engine E is mounted, a front cross member 12 providing a connection between front ends of the front side frames 11, left and right upper members 13 disposed laterally outside the front side frames 11, left and right side sills 14 connected to rear ends of the upper members 13, a middle cross member 15 providing a connection between rear ends of the side sills 14, left and right rear side frames 16 connected to the rear ends of the side sills 14, and a rear cross member 17 providing a connection between rear ends of the rear side frames 16.

The front side frames 11, the upper members 13, the side sills 14, and the middle cross member 15 are connected to each other by a first floor frame 18 extending laterally and two second floor frames 20 extending longitudinally. A floor panel 21 is provided so as to stretch over a region bounded by the front side frames 11, the side sills 14, and the middle cross member 15 (see FIG. 3 and FIG. 4). Supported on an upper face of the floor panel 21 are a driver's seat 22 and a passenger's seat 23 which are front seats, and a rear seat 24.

Figure 3:
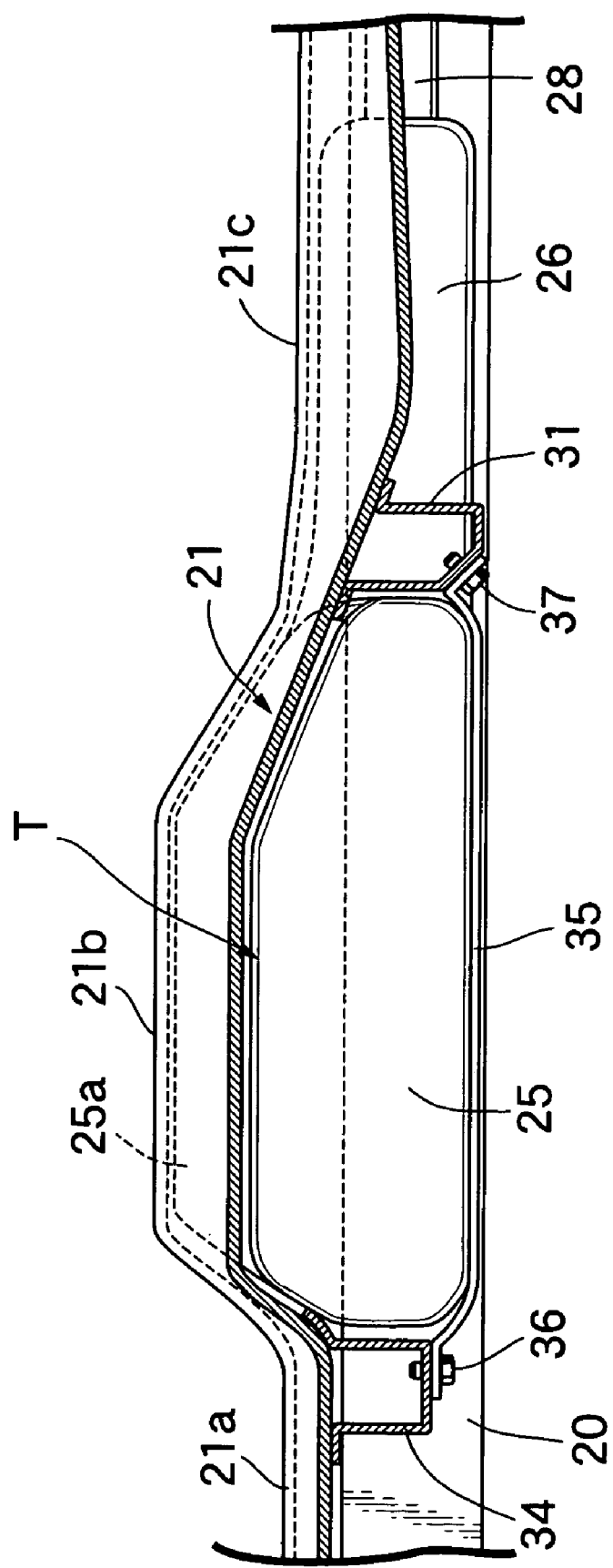
Figure 4:
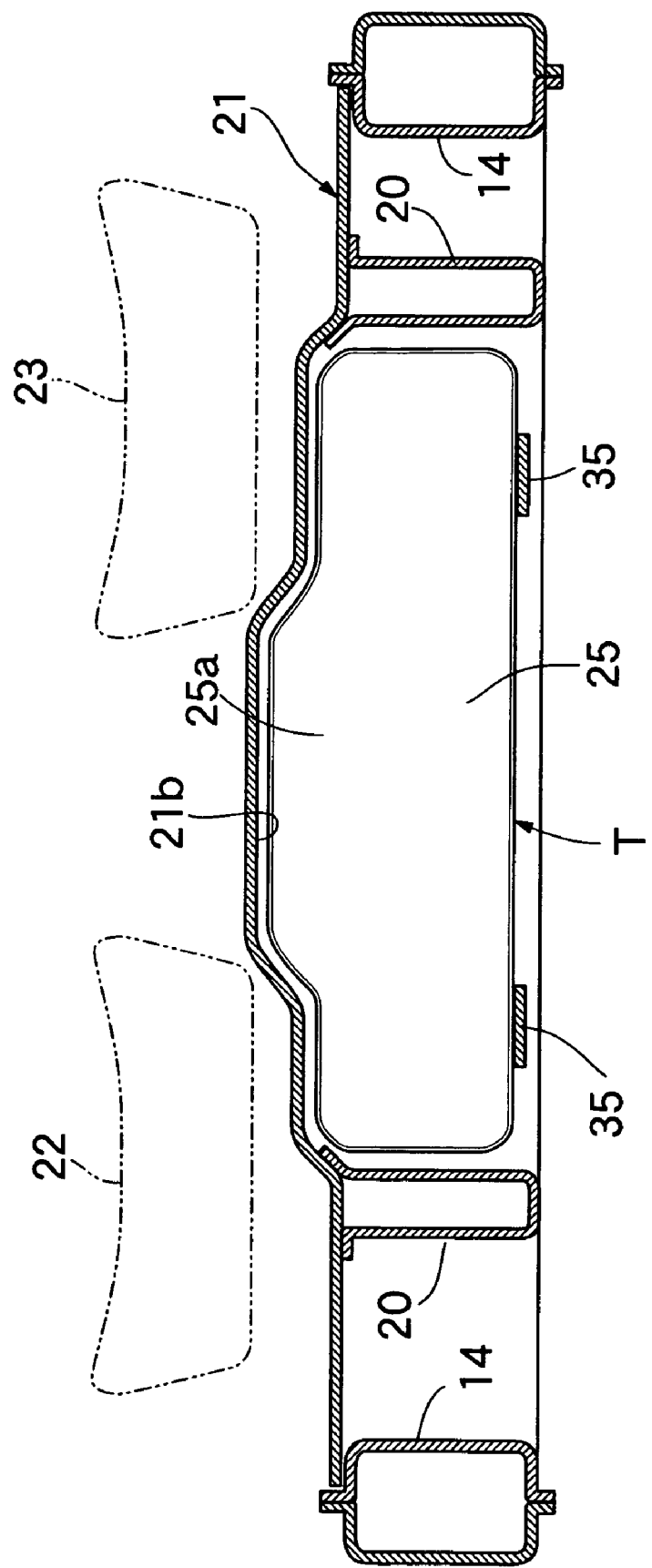

As is clear by referring also to FIG. 3 and FIG. 4, a fuel tank T is disposed on a lower face of the floor panel 21 beneath the driver's seat 22 and the passenger's seat 23, and includes a main body portion 25 having a substantially rectangular shape in plan view, and a long and narrow longitudinally protruding portion 26 protruding rearward from a rear face of the main body portion 25. Floor tunnels 21a, 21b, and 21c extending longitudinally in a laterally middle part are formed in the floor panel 21 so as to project upward. These floor tunnels 21a, 21b, and 21c are shown by broken lines in FIG. 2, and by solid lines in FIG. 3 and FIG. 4. Because the motor vehicle V is a front-engined front-wheel-drive vehicle, the floor tunnels 21a, 21b, and 21c do not house a propeller shaft.

Among the floor tunnels 21a, 21b, and 21c, the floor tunnel 21b in the middle protrudes the most, and a bulge 25a expanding upward from a middle part of the main body portion 25 of the fuel tank T is housed within the floor tunnel 21b. Housed within the floor tunnel 21c on the rear side is the protruding portion 26 that protrudes rearward from the main body portion 25 of the fuel tank T. A fuel supply pipe 28 extending from a fuel filler inlet 27 provided on the left side of a rear part of a vehicle body extends forward within the floor tunnel 21c on the rear side, and is connected to the rear end of the protruding portion 26 of the fuel tank T.

Figure 5:
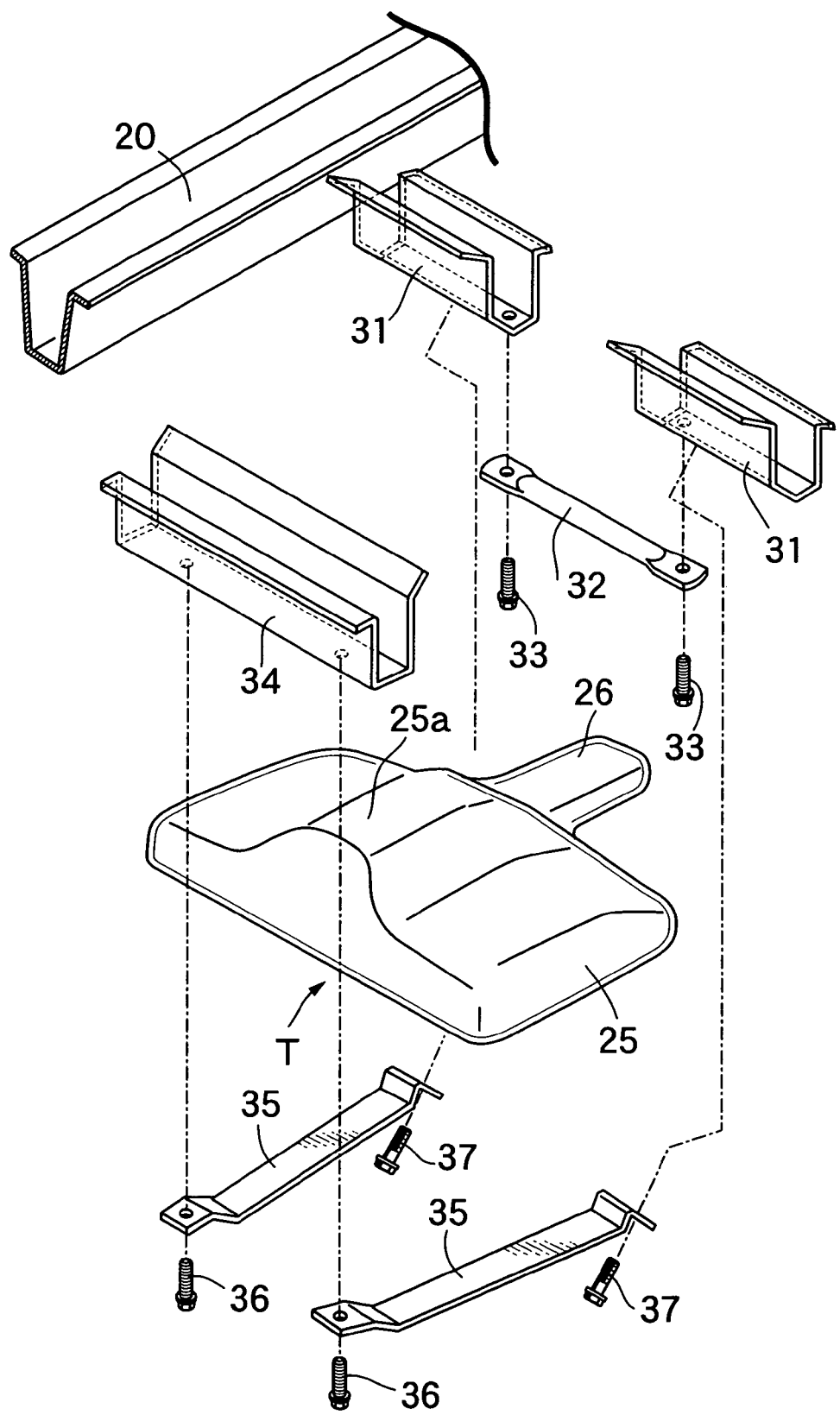

As is clear from FIG. 2, FIG. 3, and FIG. 5, the protruding portion 26 of the fuel tank T is fitted between mutually opposed inner ends of rear fuel tank support frames 31 fixed to the pair of second floor frames 20, and lower faces of the rear fuel tank support frames 31 are connected to each other via a connecting bracket 32 and bolts 33. In front of the fuel tank T, front ends and rear ends of two longitudinally extending bands 35 are fixed to a front fuel tank support frame 34 fixed to a lower face of the floor panel 21 and the rear fuel tank support frames 31 respectively via bolts 36 and 37. The fuel tank T, whose lower face is supported by these two bands 35, is fixed by being pushed against the lower face of the floor panel 21.

As described above, because the fuel tank T is supported on the lower face of the floor panel 21 beneath the driver's seat 22 and the passenger's seat 23, the degree of freedom in the arrangement of the rear seat 24 can be increased, thereby efficiently utilizing the space of the rear part of the vehicle body. Furthermore, if the fuel tank T is disposed on lower faces of the driver's seat 22 and the passenger's seat 23, it is difficult to secure a sufficient capacity of the fuel tank T, but by housing the protruding portion 26 of the fuel tank T within the floor tunnel 21c, capacity can be gained for the fuel tank T.

Furthermore, if the fuel tank T is disposed beneath the driver's seat 22 and the passenger's seat 23, the fuel supply pipe 28 that provides a connection between the fuel filler inlet 27 and the fuel tank T inevitably becomes long, and the fuel feed resistance when fuel passes through the fuel supply pipe 28 increases to hinder smooth feeding. However, by connecting the fuel supply pipe 28 to the rear end of the protruding portion 26 that protrudes rearward from the fuel tank T, it is possible to make the fuel supply pipe 28 as short as possible, thereby minimizing the increase in fuel feed resistance. In particular, when evaporated fuel within the fuel tank T is supplied to a canister and adsorbed thereby during refueling, the fuel feed resistance is increased by an amount corresponding to the flow resistance in the canister, but by shortening the fuel supply pipe 28 it is possible to contribute to a reduction in the overall fuel feed resistance.

Although one embodiment of the present invention has been explained above, the present invention can be modified in design in a variety of ways without departing from the subject matter thereof.

For example, the structure of the vehicle body frame and the support structure for the fuel tank T are not limited to those of the embodiment.

What is claimed is:

1. A fuel tank arrangement in a vehicle, comprising a fuel tank disposed on a lower face of a floor panel beneath a driver's seat and a passenger's seat,
   wherein a floor tunnel that passes between the driver's seat and the passenger's seat is formed in the floor panel,
   wherein a protruding portion for storing fuel therein is integrally formed on the fuel tank, said protruding portion protruding rearward and being housed within the floor tunnel, and
   wherein a fuel supply pipe is connected to the rear end of the protruding portion.

2. A fuel tank arrangement according to claim 1, wherein the fuel tank has a bulge expanding upward and housed within the floor tunnel, said bulge extending toward a front end of the protruding portion, said protruding portion having a height lower than that of said bulge.

\* \* \* \* \*